Figure 1:
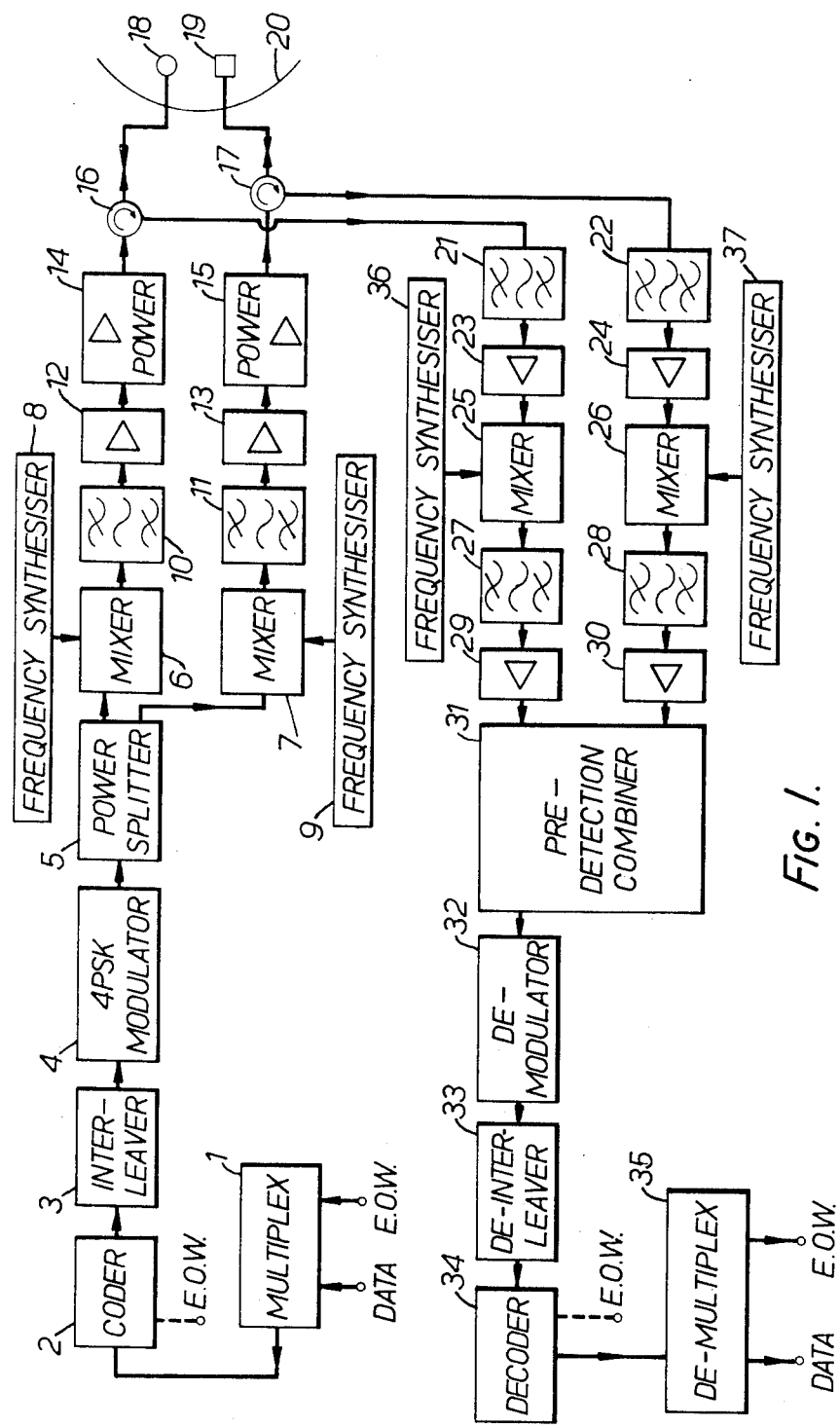

United States Patent [19]

Kennard et al.

[11] 4,253,193

[45] Feb. 24, 1981

[54] TROPOSPHERIC SCATTER RADIO COMMUNICATION SYSTEMS

[75] Inventors: Paul A. Kennard; Stewart J. R. Hartley, both of Chelmsford, England

[73] Assignee: The Marconi Company Limited, Chelmsford, England

[21] Appl. No.: 956,849

[22] Filed: Nov. 2, 1978

[30] Foreign Application Priority Data

Nov. 5, 1977 [GB] United Kingdom ............... 46143/77

[51] Int. Cl.³ .......................... H04B 7/06; H04B 7/08
[52] U.S. Cl. ...................................... 455/101; 370/69; 455/137
[58] Field of Search .............. 179/15 FD; 325/39, 56, 325/154; 340/146.1 A, 146.1 BA, 146.1 BE; 455/101, 137; 370/69

[56] References Cited

U.S. PATENT DOCUMENTS

| | | | |
|---|---|---|---|
| 3,532,988 | 10/1970 | Magnuski | 325/56 |
| 3,652,998 | 3/1972 | Forney | 340/146.1 A |
| 4,001,692 | 1/1977 | Fenwick | 325/56 |
| 4,083,009 | 4/1978 | Bickford | 325/56 |

OTHER PUBLICATIONS

*Electro-Technology,* Jan. 1968, "Coding for Error Free Communications," by Albert G. Franko, pp. 53, 55–62.

*Primary Examiner*—David L. Stewart
*Attorney, Agent, or Firm*—Diller, Ramik & Wight

[57] ABSTRACT

A tropospheric scatter radio communication system uses a multiple signal diversity system in order to improve reliability of reception. A dual time diversity is used in which adjacent bits in a digital word are interleaved with bits from adjacent digital words so that more than one bit from a particular digital word is unlikely to be adversely affected by short term fading.

13 Claims, 2 Drawing Figures

TROPOSPHERIC SCATTER RADIO COMMUNICATION SYSTEMS

This invention relates to tropospheric scatter radio communication systems and is specifically concerned with such systems employing some form of signal diversity so as to improve the reliability of signal reception of a communication signal under adverse transmission conditions. Radio communication systems relying on tropospheric scatter are subject to rapid short term fading, which is dependent partly on the characteristics of the transmitted signal and partly on the characteristics of the signal transmission path. To improve the system reliability it has become usual to incorporate some form of signal diversity, that is to say, two or more separate signals are transmitted which are subject to different fading characteristics in such a manner that at least one of the two diversity signals will be received with sufficient strength to enable an intelligible message to be recovered. Even so, the use of a dual diversity system can present an unacceptably, unreliable operation and it has been proposed to adopt a quad-diversity system, that is to say a system in which four separate signals are transmitted or received, each of which is subject to a different fading characteristic. Such systems can be unacceptably expensive and/or complex and the present invention seeks to provide a tropospheric scatter radio communication system in which the benefits of quad-diversity can be achieved relatively simply and inexpensively.

According to the broadest aspect of this invention, a tropospheric scatter radio communication system includes a dual time diversity in combination with a further dual diversity using only a single antenna at each signal terminal of a communications link.

According to a further aspect of this invention, a tropospheric scatter radio communication includes a dual time diversity in which adjacent bits in a digital word are spaced apart by a predetermined amount in combination with a dual frequency diversity or a dual angle diversity. For most applications, frequency diversity appears to provide a more reliable operation, but for relatively long links having fixed terminal sites, angle diversity can provide a link of similar reliability and which is relatively economical in hardware.

Preferably, the time diversity is achieved by transmitting a signal, in digital form, in which individual digital bits of a common digital word are spaced apart in time and are interleaved with digital bits from an adjacent digital word. The amount by which adjacent digital bits from the same digital word are spaced apart is sufficiently long in relation to the expected fading period of the communications link so as to ensure that most of the digital bits of that word can be reliably received. In practice, the spacing between adjacent bits of a common digital word will depend on the expected fading characteristics of the communications link.

Preferably again, each digital word contains digital bits which are additional to message bits and which are used to provide an error correction facility. Commonly, such an error correction facility can tolerate the loss of at least a single bit error in any digital word without loss of information.

Figure 2:
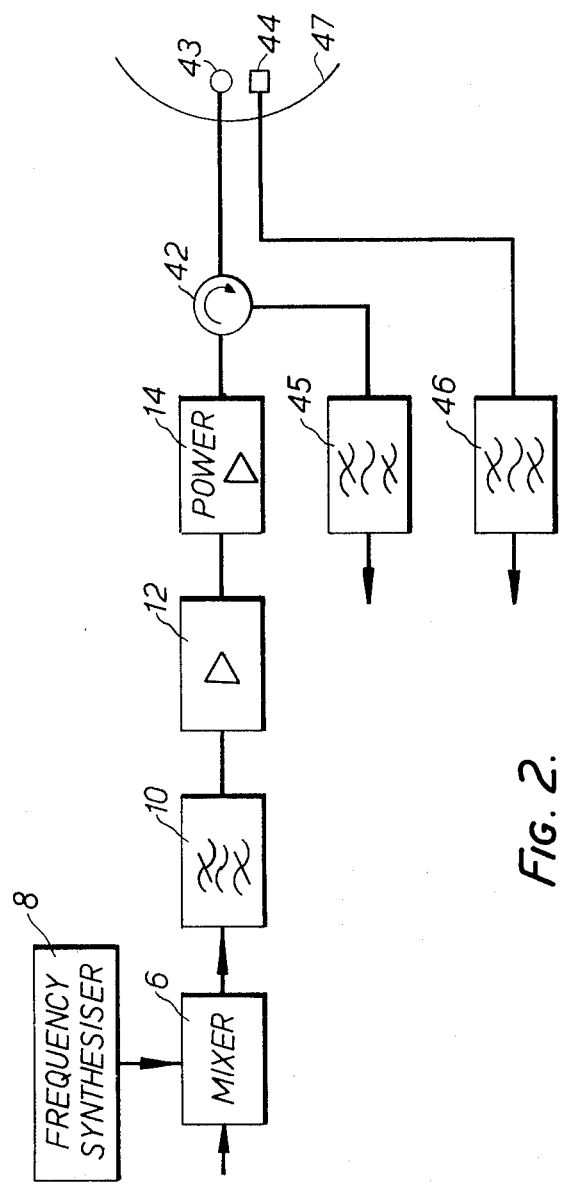

The invention is further described, by way of example, with reference to the accompanying drawings in which, FIG. 1 shows part of a communication system using frequency-time quad diversity and, FIG. 2 shows part of a communication system using angle-time quad diversity.

Referring to FIG. 1, there is shown therein in simplified diagrammatic form one terminal station for a communications link. Although, of course, two terminal stations are required, one at each end of the link, only one is illustrated since both are essentially the same. The speech or data information to be sent over a communication link is initially applied to a multiplex equipment 1. This, typically, receives 16 to 120 speech channels, and provides a time division multiplexed output signal. Such equipments are available commercially and serve to combine a number of individual speech or data information channels into a composite continuous digital bit stream. If desired, an engineering order wire (E.O.W.) can be incorporated, at this stage, for the purpose of providing supervisor or control information from one terminal station to the other. In such a case, the E.O.W. forms one channel of the time division multiplex signal. The composite signal, so formed, is passed to a coder 2 in which error correction bits are added to each digital word. To enable this to be achieved, the data rate is increased to accommodate the insertion of the additional error correction bits. Typically, an incoming data bit rate of 250 k bits/second is increased to 448 k bits/second and the data and check bits are assigned binary values according to a selected error correction code so that the digital word so formed has a predetermined parity.

The use of error correction codes is, itself, well known and many of these codes are of the cyclic variety which require the use of only readily available circuitry. The additional number of check bits added to the incoming data bits is chosen as a compromise between signal handling capacity and the reliability required for the communications link. The digital words, each consisting of data bits and error correction bits, are then passed to an interleaver 3 which spaces apart in time adjacent bits for each digital word and, inserts into the spaces so produced, digital bits from adjacent digital words. The degree of spacing selected is dependent on the period of the fading expected for the communications link. The nature of the tropospheric medium is such that a nominal carrier frequency will exhibit a particular fading rate and fade duration. This fading is sometimes called "Rayleigh Fading", and in order to reduce its effect, a time diversity system based on bit interleaving, is used. This means that if fading occurs to prevent reception of a particular bit or pair of bits in a particular digital word, the remainder of the bits in that word are likely to be received to enable the data to be wholly reconstructed using the error correction facility. Since adjacent bits in each digital word are sufficiently spaced apart so as not to be both affected by the same fading cycle, their fading characteristics are said to be non-correlated.

Some degree of signal transmission reliability is inherently obtained from the use of an error correction technique, but the improvement due to the interleaving of the digital bits is peculiar to the medium and the frequency of transmission. In principle, the bit interleaving consists of putting a fixed time period between adjacent bits in the digital bit stream so that fading correlation between bits corresponding to a common digital word is small. This de-correlation process, or time diversity, reduces the number of errors which are likely to occur in any given digital word and enables the error correction bits to provide enhanced signal reception. The interleaved digital bit stream is passed to a phase-shift-keying modulator 4 which converts the individual bits into an appropriate one of four phase shift levels. The modulator 4 accepts the binary data at a data rate between sixteen channels and twenty-four channels, as mentioned previously, and outputs a four-phase carrier of typically 70 MHz, each phase conveying two bits of information. The modulator could, for example, take the form of that shown in our copending Patent Application No. 32612/75.

The modulated signal is passed via a power splitter 5 to two transmitter mixers 6 and 7, where each 70 MHz carrier is mixed with a different synthesized R.F. frequency obtained from a respective synthesizer 8 and 9 to produce two carrier frequencies F1 and F2. The signals so obtained are chosen so as to be sufficiently spaced apart in frequency to provide the required degree of fading de-correlation. Each signal so produced is passed through a tunable filter 10 and 11 which rejects one of the two side bands introduced by the mixers 6 and 7. The resulting signals are passed via intermediate power amplifiers 12 and 13, final power amplifiers 14 and 15 to three-port circulators 16 and 17, which are coupled to two antenna feeds 18 and 19. As is known, circulators are non-reciprocal devices, and in this case serve to transfer power from power amplifiers 14 and 15 to antenna feeds 18 and 19, whilst passing very little power into the third ports of the circulators. The two antenna feeds are mounted on a common antenna dish 20, typically the antenna dish 20 is a 4.5 meter parabolic dish with dual polarised feed horns. The two feed horns 18 and 19 transmit simultaneously via the troposphere to a second terminal station which is essentially similar to the terminal station shown in FIG. 1. Consequently, the receiving process will be described also with reference to the terminal shown in FIG. 1.

The circulators 16 and 17 route the received signals to a pair of tunable filters 21 and 22 via their respective third ports. The two filters 21 and 22 are so tuned as to pass a different one of the two frequencies F1 or F2 which constitute the frequency diversity. These filters are very selective and are typically five-cavity filters, designed to reject unwanted signals and adjacent carriers. After filtering, the two frequencies are passed to amplifiers 23 and 24, having high intercept points designed to keep intermodulation products to a minimum. These amplifiers have a broad band frequency response with no tuning facility. After amplification, the two frequencies are passed to a pair of R.F. mixers 25 and 26 which, again, have high intercept points to minimise intermodulation products. The mixers 25 and 26 mix a microwave frequency obtained from a respective microwave frequency synthesizer 36 or 37 with the amplified signals from amplifiers 23 and 24. Each mixer incorporates an I.F. amplifier which is centred on 70 MHz and acts as a buffer between the mixer outputs and the following I.F. filters 27 and 28.

After further amplification by amplifiers 29 and 30, the two signals are combined at a pre-detection combiner 31. This combiner acts in a maximal ratio fashion and, depending on the relative instantaneous strengths of the two signals received from amplifiers 29 and 30, it will alter the gain of the relevant amplifier. The two signals are combined in equal phase at 70 MHz and, subsequently, de-modulated in a four-phase shift keying de-modulator 32, which provides the reverse function to that provided by the modulator 4. The digital stream provided by the de-modulator 32 is passed through a de-interleaver 33 which assembles the received data stream into individual data words of consecutive data bits. In effect, the interleaving period is removed and the data is restored to its original format, prior to interleaving. The resulting sequence of digital words are passed via a de-coder 34 to a de-multiplexer 35. The de-coder 34 checks the redundant error correction bits in each digital word so as to correct typically one bit in error.

It will be appreciated that there exists a system delay between transmitted and received voice channels, which is related to the period between adjacent bits introduced by the interleaving process. Consequently, whilst this delay is made sufficiently great to provide two de-correlated signals in a time diversity mode, the delay must be sufficiently small so as to be acceptable to users of the communications system. This consideration is particularly relevant to two-way telephone speech links.

FIG. 2 illustrates an alternative form of terminal station in which angle diversity is used. With angle diversity, it is proposed to provide either a dual angle diversity transmission or reception and, possibly, both.

The terminal station shown in FIG. 2 is a quad diversity system using a dual-time diversity, as described with reference to FIG. 1, in combination with a dual angle diversity. The terminal station is similar to FIG. 1 up to, and including, the modulator 4. The splitter is omitted and one drive chain is used, namely mixer 6, synthesizer 8, tunable filter 10, I.P.A. 12 and a single high power amplifier 14. The amplifier 14 is connected to the single transmit feed horn 43 via the three port circulator 42. The two feed horns 43 and 44 are so aligned so that there is an angular offset between their radiation patterns. The degree of offset is sufficient to produce de-correlation between the two receive signals when the antenna 47 is irradiated by a typical troposcatter receive signal. Dual diversity is achieved in this manner. The antenna may be as described in our U.S. Pat. No. 1,178,782.

Signals received by the antenna 47 are routed via the feed horns 43 and 44, and the third port of the three-port circulator 42 to tunable filters 45 and 46 which remove unwanted frequencies. Thereafter, the signals are processed in a manner analogous to that shown in FIG. 1. It will be understood that the terminal station, shown in FIG. 2, is relatively less expensive than that shown in FIG. 1, since only a single carrier frequency is used. This avoids the need for two power amplifiers and a power splitter etc.

We claim:

1. A tropospheric scatter radio communication system including a time diversity, in which adjacent bits in a digital word are spaced apart in time by a predetermined amount which is related to the tropospheric fading characteristic, in combination with a dual frequency diversity or a dual path angle diversity, using only a single antenna on each signal terminal of a communications link.

2. A system as claimed in claim 1 and wherein the time diversity is achieved by transmitting a signal, in digital form, in which individual digital bits of a common digital word are spaced apart in time and are interleaved with digital bits from an adjacent digital word.

3. A system as claimed in claim 2 and wherein each digital word contains digital bits which are additional to message bits and which are used to provide an error correction facility.

4. A tropospheric scatter communication system, which reduces the effect of tropospheric fading comprising, in combination:
  (a) a pair of stations forming a tropospheric scatter communication link;
  (b) means at one station for transmitting time diversity coded data from a single antenna and means at the other station for receiving said transmitted time diversity coded data as a pair of discrete signals each containing said time diversity coded data, said pair of discrete signals being received by a single antenna and being further diverse either as to frequencies of transmission wherein the frequencies of transmission are sufficiently spaced apart to provide fading de-correlation at said means for receiving or as to angles of reception wherein the angular offset between said angles of reception is sufficient to provide fading de-correlation at said means for receiving; and
  (c) means for simultaneously processing said discrete signals at said other station to recover said data.

5. The system as defined in claim 4 wherein said means for transmitting includes encoding means for accepting digital data words and spacing adjacent bits of each word apart in time by a sufficient amount to provide non-correlation with tropospheric fading.

6. The system as defined in claim 5 wherein said means for transmitting includes carrier modulating means for accepting two identical time diversity encoded data signals from said encoding means and imparting one frequency to one signal and a different frequency to the other signal where such difference in frequency is sufficient to provide the required degree of fading de-correlation.

7. The system as defined in claim 6 wherein said means for transmitting includes a single antenna comprising two feed horns mounted on a single antenna dish wherein one of said feed horns transmits one of the said diverse frequencies from said carrier modulating means and the other said feed horn simultaneously transmits the other frequency from said carrier modulating means.

8. The system as defined in claim 5 wherein said means for receiving includes a single antenna comprising two feed horns so aligned on a single antenna dish wherein there is an angular offset between their radiation patterns sufficient to provide said fading de-correlation between the said pair of discrete signals received, and also means for decoding said time diversity coded data contained in said pair of discrete signals.

9. A tropospheric scatter communication system, which reduces the effect of tropospheric fading comprising, in combination:
  (a) a first station including time diversity encoding means having an input adapted to be connected to a digital data stream wherein individual digital bits of a common digital word are spaced apart in time and are interleaved with digital bits from an adjacent digital word, and means including a single antenna for transmitting the output of said encoding means;
  (b) a second station including means including a single antenna for receiving said transmission from the first station as a pair of discrete signals each containing said time diversity coded data and said pair of signals being further diverse either as to frequencies of transmission wherein the frequencies of the transmitted signals are sufficiently spaced apart to provide fading de-correlation at said means for receiving or as to angles of reception wherein the angular offset between said angles of reception is sufficient to provide fading de-correlation at said means for receiving, said receiving means including means for combining said discrete signals, and decoding means for accepting said combined signals and recovering said digital data stream in its original form.

10. The system as defined in claim 9 wherein said transmitting means includes means for splitting said time diversity coded signal to provide two time diversity coded signals, carrier modulating means for imparting one frequency to one of said time diversity coded signals and a different frequency to the other of said time diversity coded signal where such difference in frequencies is sufficient to provide the required degree of fading de-correlation, and a single antenna comprising two feed horns mounted on a single antenna dish wherein one feed horn accepts and transmits the time diversity coded signal of one frequency from said carrier modulating means and the other feed horn accepts and transmits the time diversity coded signal of the other frequency from said carrier modulating means.

11. The system as defined in claim 9 wherein said transmitting means includes an antenna having a single feed horn connected to the output of said encoding means, and said means for receiving includes a single antenna comprising two feed horns so aligned on a single antenna dish wherein there is an angular offset between their radiation patterns sufficient to provide said fading de-correlation between the said pair of discrete signals received, and means for decoding said time coded data.

12. A tropospheric scatter communication system, which reduces the effect of tropospheric fading comprising, in combination:
  (a) a pair of stations forming a tropospheric scatter communication link;
  (b) means including a single antenna at one station for transmitting time diversity coded data and means including a single antenna at the other station for receiving said transmitted time diversity coded data as a pair of discrete signals each containing said time diversity coded data, said pair of discrete signals being further diverse either as to frequencies of transmission wherein the frequencies of transmission are sufficiently spaced apart to provide fading de-correlation at said means for receiving or as to predetermined angle diversity of the paths of said discrete signals sufficient to provide fading, de-correlation at said means for receiving; and
  (c) means for simultaneously processing said discrete signals at said other station to recover said data.

13. A tropospheric scatter communication system, which reduces the effect of tropospheric fading comprising, in combination:
  (a) a first station including time diversity encoding means having an input adapted to be connected to a digital data stream wherein individual digital bits of a common digital word are spaced apart in time and are interleaved with digital bits from an adjacent digital word, and means including a single antenna for transmitting the output of said encoding means;

(b) a second station including means including a single antenna for receiving said transmission from the first station as a pair of discrete signals each containing said time diversity coded data and said pair of signals being further diverse either as to frequencies of transmission wherein the frequencies of the transmitted signals are sufficiently spaced apart to provide fading de-correlation at said means for receiving or as to predetermined angle diversity of the paths of said discrete signals sufficient to provide fading de-correlation at said means for receiving, said receiving means including means for combining said discrete signals, and decoding means for accepting said combined signals and recovering said digital data stream in its original form.

* * * * *